United States Patent Office 2,908,005
Patented Oct. 6, 1959

2,908,005
ESTERS OF POLYHYDRIC PHENOLS

Sylvan O. Greenlee, Racine, Wis., assignor to S. C. Johnson & Son, Inc., Racine, Wis.

No Drawing. Application April 22, 1955
Serial No. 503,325

17 Claims. (Cl. 260—19)

This invention relates to a new class of synthetic esters prepared from an unsaturated aliphatic acid and a polyhydric phenol. More particularly, this invention relates to a novel synthetic polyester prepared by esterifying the phenolic hydroxyl groups of a polyhydric phenol which is the ester of a polyhydric alcohol and an aryloxy-substituted acid.

In the formulation of plasticized resin compositions, one of the greatest problems encountered is the manner of plasticizing and imparting air-drying or heat conversion characteristics while retaining other desired properties. According to conventional practice, the resin is compounded with one or more materials which contribute the plasticizing and/or drying characteristics. Since the resin and plasticizer or drying oil must be completely miscible with one another, certain other properties of the resin are sacrificed. For example, a formulator will choose a very soluble resin because of its miscibility even though the product is inferior with respect to toughness, chemical resistance or flexibility.

Long-chain unsaturated acids containing at least about 10 carbon atoms constitute suitable plasticizers. These materials also are desirable because of the conversion characteristics imparted due to their unsaturation. The present invention embraces the production of the esters of such acids and polyhydric phenols. By esterifying the hydroxyl groups of the phenols with converting or plasticizing acids, products having a wide variety of properties may be obtained. Products of this type dissolved in an organic solvent form coating compositions which, on air drying, polymerize through the unsaturated groups to form flexible tack-free films.

The present compositions provide a chemical union in each molecule of one or more plasticizing or converting groups together with a resinous group which has been tailored to suit a particular need. The resinous group herein contemplated is a compound such as that disclosed in the copending Greenlee application of even date entitled "Polyhydric Phenols." These materials, having controlled molecular weights, hydroxyl content, softening points and solubility characteristics, are the esters of polyhydric alcohols and an aryloxy-substituted pentanoic acid such as 4,4-bis(4-hydroxyphenyl)pentanoic acid. The esterification of the phenolic hydroxyl groups of the glycol diester of this acid with 9-undecenoic acid illustrates the subject compositions.

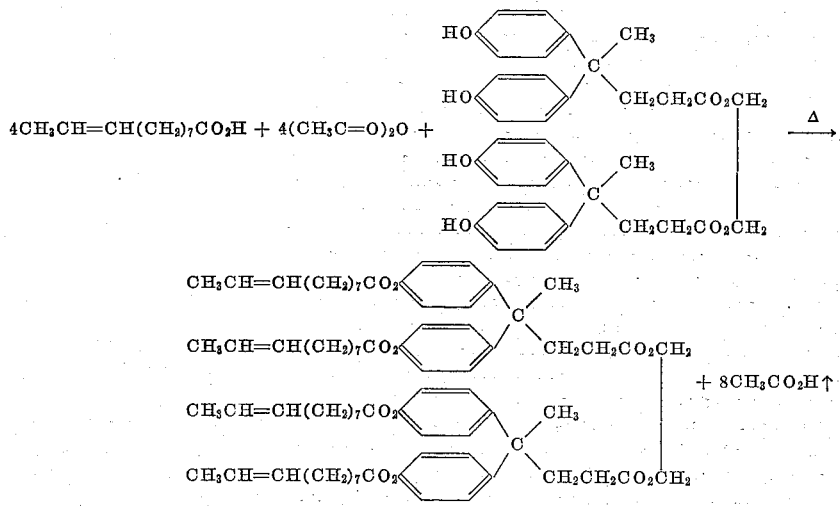

The polyhydric phenols employed for preparing the long-chain acid esters of this invention are those derived from an aryloxy-substituted pentanoic acid and a polyhydric alcohol having a molecular weight of not more than about 8,000. In prior applications, Serial Nos. 464,607 and 489,300, filed October 25, 1954 and February 18, 1955, respectively, there are disclosed a number of compounds which are suitable for use as the aryloxy-substituted pentanoic acids herein contemplated. These materials, which are referred to for convenience as Diphenolic Acid, consist of the condensation products of levulinic acid and phenol, substituted phenols, or mixtures thereof. It is to be understood that the phenolic nuclei of the Diphenolic Acid may be substituted with any groups which will not interfere with the esterification reactions. For example, the nuclei may be alkylated with alkyl groups of from 1 to 5 carbon atoms as disclosed in Serial No. 489,300 or they may be halogenated.

The polyhydric alcohols used in the preparation of the aforementioned polyhydric phenols may be of the nonresinous type or of the resinous type. Suitable nonresinous polyhydric alcohols include the simple glycols such as ethylene glycol, propylene glycol, 1,4-butane-diol, 2,5-pentanediol, and neopentyl glycol; polyhydroxy ethers such as the polymeric polyhydric alcohols exemplified by polyalkylene glycols such as polyethylene glycol, polypropylene glycol, etc. Others contemplated include glycerol, erythritol, pentaerythritol, polypentaerythritols, sorbitol, mannitol, alpha-methyl glucoside, polyallyl alcohols, tetramethylol cyclohexanol and polyalkanol amines such as diethanolamine, and triethanolamine.

Illustrating resinous polyhydric alcohols which may be used in the preparation of the polyhydric phenols are the reaction products of di- and trihydric phenols with chlorohydrins. For example, the reaction of bis(4-hydroxyphenyl) isopropylidene with ethylene chlorohydrin or glycerol monochlorohydrin yields a resinous polyhydric alcohol. The reaction of the same dihydric phenol with epichlorohydrin or glycerol dichlorohydrin produces resinous polyhydric alcohols which in some cases contain epoxide groups in addition to the alcoholic hydroxyl groups. (The epoxide-containing products are well illustrated by the commercially available Epon resins.) The preparation of these resinous polyhydric alcohols is described in U.S. Patents 2,456,408, 2,503,726, 2,615,008, 2,668,805, and 2,668,807.

Other types of resinous polyhydric alcohols are those prepared by the reaction of phenol-formaldehyde condensates with chlorohydrins. An alkyl phenol may be condensed with formaldehyde, followed by treatment of an alkaline solution of this intermediate methylol derivative with a chlorohydrin such as glycerol monochlorohydrin to form a resinous polyhydric alcohol. It is contemplated that the resinous polyhydric alcohols may in some cases contain epoxide groups. Since the latter are essentially anhydrides of glycols, on esterification with carboxylic acids, they act as glycols and increase the alcoholic hydroxyl content of the resinous polyhydric alcohol.

It will be noted that in the use of certain resinous polyhydric alcohols the control of the number of phenolic hydroxyl groups and molecular weights of the resulting products are limited to knowledge of the alcoholic hydroxyl content and molecular weight of the resinous polyhydric alcohol being used. For example, where the resinous polyhydric alcohol is one prepared by treating the alkaline solution of a phenol-formaldehyde condensate with a chlorohydrin, the product is essentially a mixture of resinous compositions having varying molecular weights, and, therefore, varying alcoholic hydroxyl contents. However, these resinous compositions are valuable polyhydric alcohols for use herein since the low molecular weight materials, containing a low average number of hydroxyl groups per molecule, on esterification, yield a relatively low molecular weight resinous polyhydric phenol, whereas a high molecular weight resinous polyhydric alcohol containing many alcoholic hydroxyl groups per molecule will give a relatively high molecular weight polyhydric phenol on esterification with diphenolic acids.

Esterification of either the nonresinous or resinous polyhydric alcohols with Diphenolic Acid is conveniently carried out by direct heating at temperatures of from 190–275° C. under conditions such that the water produced during condensation is continuously removed as it is formed. Where a composition of the Epon resin type is esterified only to the extent of one carboxyl group reacting with one epoxide group, lower temperatures may be used and no water is formed since the reaction of the carboxyl group with the epoxide group is that of direct addition. Since the Diphenolic Acid and the polyhydric alcohols have boiling points which are in all cases above 190° C., the water may be removed by permitting it to volatilize during esterification. Removal of the water may also be facilitated by continuously bubbling through the reaction mixture during esterification a stream of inert gas, such as carbon dioxide or nitrogen. It is also sometimes convenient to remove water by carrying out the reaction in a vessel provided with condenser attached thereto through a water trap, adding a sufficient amount of a volatile, water-insoluble solvent to cause refluxing at the esterification temperature, continually removing the water by azeotropic distillation and permitting the solvent to return to the reaction mixture after having dropped the water in the water trap. Other methods of esterification are contemplated, including esterification of the polyhydric alcohols with acid chlorides, and esterification by acid interchange of the high molecular weight acid with, for example, acetates of the polyhydric alcohols.

A brief study of the prior art will show these polyhydric phenols to be unique. Heretofore, very few such phenols have been available wherein each hydroxyl group is attached to a different nucleus. Examples of prior art materials are bisphenol [bis(4-hydroxyphenyl)-isopropylidene] and the phenol-aldehyde condensation products. According to the teachings of the present invention, the preparation of a great variety of polyhydric phenols is possible merely by varying the polyhydric alcohol employed for esterification. Fully esterified by a Diphenolic Acid, ethylene glycol yields a tetrahydric phenol, glycerol yields a hexahydric phenol, dipentaerythritol yields a dodecahydric phenol, etc.

The following examples list the acid values and softening points of a number of polyhydric phenols prepared by heating mixtures of the polyhydric alcohols with 4,4-bis(4-hydroxyphenyl)-pentanoic acid under conditions such that water formed during esterification was removed by distillation. Softening points as used herein were run by the Durrans' Mercury Method (Journal of Oil & Color Chemists' Association, 12, 173–175 [1929]). Acid values as used herein are defined as the number of milligrams of potassium hydroxide equivalent to the acidity of a one-gram sample.

| Example Number | Mols Polyhydric Alcohol Used Per Mol 4,4-bis(4-hydroxyphenyl)-Pentanoic Acid | Acid Value | Softening Point, °C. |
|---|---|---|---|
| I | 0.5 Ethylene Glycol | 15.0 | 98 |
| II | 0.55 Ethylene Glycol | 7.3 | 89 |
| III | 0.5 Glycerol | 5.8 | 99 |
| IV | 0.37 Glycerol | 6.3 | 108 |
| V | 0.3 Methyl alpha-d-glucoside | 24.0 | 146 |
| VI | 0.57 Diethanolamine | 32.0 | 99 |
| VII | 0.55 Polyethylene Glycol of molecular weight 3350. | 11.6 | 53 |
| VIII | 0.34 Trimethylol Ethane | 3.1 | 103 |
| IX | 0.33 Sorbitol | 8.9 | 127 |
| X | 0.29 Pentaerythritol | 3.5 | 109 |

The following examples illustrate the preparation of polyhydric phenols prepared by esterification of resinous polyhydric alcohols with Diphenolic Acid.

| Example Number | Parts By Weight Resinous Polyhydric Alcohol Esterified With 1 Mol 4,4-Bis(4-hydroxyphenyl)-Pentanoic Acid | Acid Value | Softening Point, °C. |
|---|---|---|---|
| XI | 265 Epon 1004, a resinous polyhydric alcohol containing some epoxide prepared from epichlorohydrin and bis-(4-hydroxyphenyl) isopropylidene. Softening point 95–105° C., epoxide equivalent 870–1025. Manufactured by Shell Chemical Corp. | 12.7 | 148 |
| XII | 175 Bis(hydroxyethyl ether) of bis-(4-hydroxyphenyl) isopropylidene. | 7.6 | 88 |
| XIII | 100 reaction product of 1 mol bis-(4-hydroxyphenyl) isopropylidene with 2 mols epichlorohydrin in the presence of 2.2 mols sodium hydroxide to give a resinous epoxide having a softening point of 43° C. and an equivalent weight to epoxide of 325. | 15.2 | 113 |
| XIV | 220 reaction product of 2 mols bis-(4-hydroxyphenyl) isopropylidene with 1 mol epichlorohydrin and 2 mols ethylene chlorohydrin in the presence of 3.5 mols sodium hydroxide. | 12.5 | 101 |
| XV | 500 reaction product of 1 mol p-tert-butylphenol with 1.5 mols formaldehyde and 1.5 mols ethylene chlorohydrin in the presence of 1½ mols sodium hydroxide. | below 5 | 149 |

The long-chain acids which are contemplated for use in preparing the synthetic esters of this invention include the unsaturated monocarboxylic acids of at least about 10 carbon atoms. Illustrative of such acids are the drying oil fatty acids which normally contain from 18 to 22 carbon atoms such as acids obtained by the saponification of naturally-occurring, unsaturated vegetable oils including China wood oil, oiticica oil, linseed oil, soyabean oil, corn oil, and cottonseed oil. The fish oils constitute another important source of operable unsaturated acids. These materials, derived principally from the menhaden and the sardine, contain the glycerides of highly unsaturated acids and have an iodine value ranging from about 130 to 190. Suitable acids may be produced by another synthetic means, for example, mixed linoleic acids may be obtained by saponifying dehydrated castor oil. Oleic acid may be used to prepare a linoleic acid by hydroxylating the same to form dihydroxystearic acid, followed by dehydration of the latter. Lower molecular weight unsaturated acids may also be used if only air-drying characteristics are desired, but those containing less than about 10 carbon atoms contribute little plasticization. An example of one of the lower plasticizing acids contemplated is undecenoic acid, a commercially available material, a decomposition product of castor oil acids.

Esterification of the hydroxyl groups of the polyhydric phenols is carried out by treating the same with the chloride of the desired long-chain acid, liberating HCl as the ester is formed. Alternatively, the esterification may be accomplished by heating the phenol with the desired acid in the presence of acetic anhydride, the amount of the latter being about 10% in excess of the molar proportion of acid used. Heating at temperatures of about 190° to 260° C. will remove, by distillation, unreacted acetic anhydride as well as acetic acid formed in the process.

The following examples illustrate the long-chain unsaturated acid-polyhydric phenol esters of this invention. These embodiments are not intended to limit the invention, and should not be so construed. Quantities of materials expressed are parts by weight unless otherwise indicated.

*Example XVI*

A mixture of 85 parts of the polyhydric phenol from Example XII and 101 parts of dehydrated castor oil acids esterified to an acid value of 13 gave a viscosity of A–4 (Gardner Bubble Viscosimeter) when dissolved in heavy naphtha (boiling range 145–225° C., aniline point 60° C.). This product treated with .03% cobalt drier (based on nonvolatile content) and spread on glass panels with .0015″ film thickness applicator gave a tack-free film on air-drying for a period of 3 hours and a rocker hardness of 8 after air-drying for 24 hours (Sward rocker hardness instrument set at 100 on glass plate). Hard flexible films having a rocker hardness of 29 are also obtained by baking for 30 minutes at 150° C. This baked film was unaffected after 2½ hours in boiling water and also after 2½ hours in 5% aqueous sodium hydroxide at room temperature.

*Example XVII*

A mixture of 89.6 parts of the polyhydric phenol of Example IV and 151 parts of linseed oil acids were esterified to an acid value of 21 giving a product which had a viscosity of E at 40% nonvolatile content in heavy naphtha. This product when treated with .03% cobalt drier (based on nonvolatile content) and spread in .0015″ wet film thickness gave a tack-free air-dry in 3 hours and a rocker hardness of 14 in 24 hours. Hard flexible films having a rocker hardness of 30 were also obtained by baking at 150° C. for 30 minutes. A 24-hour air-dry film was unaffected after 15 minutes in boiling water. The baked film was unaffected after 2 hours' exposure in boiling water, and after 6 hours' exposure to 5% sodium hydroxide at room temperature.

*Example XVIII*

A mixture of 90 parts of the polyhydric phenol from Example I, 38 parts of China wood oil acids, and 116 parts of oleic acid esterified to a product having an acid value of 37, gave a viscosity of A–3 at 40% nonvolatile in heavy naphtha. This product when treated with .03% cobalt drier (based on nonvolatile content) on baking for ½ hour at 200° C. gave a flexible film having a rocker hardness of 24. This film was unaffected after exposure to boiling water for 2½ hours and also after 4 hours' exposure to 5% sodium hydroxide at room temperature.

*Example XIX*

A mixture of 95 parts of the polyhydric phenol from Example XI and 102 parts of oleic acid were esterified to an acid value of 27 to give a product which had a viscosity of U at 40% nonvolatile in heavy naphtha. This product treated with .03% cobalt drier (based on nonvolatile content) and spread in a .0015″ wet film thickness gave a hard tack-free product on baking for ½ hour at 150° C. giving a rocker hardness of 11. This film was unaffected after 1 hour exposure to 5% sodium hydroxide at room temperature.

*Example XX*

A mixture of 90 parts of the polyhydric phenol from Example X and 99 parts of 10-undecenoic acid was esterified to a value of 23 to give a product which had a viscosity of B when dissolved to 40% nonvolatile in a solvent composed of 9 parts of heavy naphtha and 10 parts of xylene. After adding .03% cobalt drier, the product when spread in .0015″ wet film thickness and baked for 30 minutes at 200° C. gave a hard tack-free film. This film was unaffected after one-half hour exposure in boiling water and also after 4 hours' exposure to 5% aqueous sodium hydroxide at room temperature.

*Example XXI*

A mixture of 114 parts of the polyhydric phenol from Example XIV, 67 parts of linseed oil acids, and 41 parts of rosin was esterified to an acid value of 21, giving a product having a viscosity of E at 40% nonvolatile in a solvent composed of 63 parts of heavy naphtha and 37 parts of xylene. After addition of .03% cobalt drier, a film of .0015″ wet film thickness was tack-free in 2½ hours, and with no drier it was tack-free after baking for ½ hour at 150° C. The 24-hour air-dry rocker hardness of this film was 32, while the rocker hardness of the baked film was 46. The baked film was unaffected after 24 hours' exposure to 5% aqueous sodium hydroxide.

*Example XXII*

A mixture of 72 parts of polyhydric phenol from Example XIII and 101 parts of soyabean oil acids esterified to an acid value of 38 gave a product having A–1 viscosity at 40% nonvolatile in heavy naphtha. After treating with .03% cobalt drier films of .0015″ wet film thickness became tack-free on baking for 30 minutes at 150° C. This film was unaffected after ½ hour exposure to 5% aqueous sodium hydroxide at room temperature and also after 2 hours' exposure to boiling water.

*Example XXIII*

A mixture of 99 parts of the polyhydric phenol from Example IX, 85 parts of dehydrated castor oil acids, and 61 parts of rosin esterified to an acid value of 21 gave J viscosity at 40% nonvolatile in a solvent composed of 85 parts heavy naphtha and 15 parts xylene. After treating with .03% cobalt drier, films of .0015″ wet film thickness became tack-free after 2½ hours' air-dry or after ½ hour at 150° C. After a 24-hour air-dry, rocker hardness was 26, and the same film after air-drying for 65 hours showed no effects after 5 hours' exposure to 5% aqueous sodium hydroxide at room temperature.

The baked film, having a rocker hardness of 51, showed no breakdown after 24 hours' exposure to 5% aqueous sodium hydroxide at room temperature.

*Example XXIV*

A mixture of 90 parts of the polyhydric phenol from Example IV and 121 parts of soyabean oil acids esterified to an acid value of 9.3 gave a viscosity of A–3 at 40% nonvolatile in heavy naphtha. After treating with .03% cobalt drier films of .0015" wet film thickness become tack-free after baking for ½ hour at 150° C.

It is to be understood that the above examples are intended to be illustrative only. They should not be construed as limiting the scope of the present invention since embodiments other than those specifically disclosed may be produced without departing from invention concept taught. It is desired therefore that only such limitations be imposed on the appended claims as are stated therein or required by the prior art.

What is claimed is:

1. A new composition of matter comprising an ester of a polyhydric phenol and at least one ethylenically unsaturated aliphatic monocarboxylic acid having at least about 10 carbon atoms, said polyhydric phenol being substantially completely free of alcoholic hydroxyl groups and being a polyester of a polyhydric alcohol having a molecular weight of not more than about 8,000 and a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms.

2. The composition of claim 1 wherein the pentanoic acid consists essentially of 4,4 bis(4-hydroxylaryl)pentanoic acid wherein the hydroxyaryl radical is a hydroxyphenyl radical and is free from substituents other than alkyl groups of one carbon atom.

3. The composition of claim 1 wherein the pentanoic acid is 4,4 bis(4-hydroxyphenyl)pentanoic acid.

4. The composition of claim 3 wherein the unsaturated monocarboxylic acid is oleic acid.

5. The composition of claim 3 wherein the unsaturated monocarboxylic acid is linseed oil acids.

6. The composition of claim 3 wherein the unsaturated monocarboxylic acid is dehydrated castor oil acids.

7. The composition of claim 3 wherein the unsaturated monocarboxylic acid is soyabean oil acids.

8. The composition of claim 3 wherein the unsaturated monocarboxylic acid is China wood oil acids.

9. The composition of claim 3 wherein the polyhydric alcohol is a glycol.

10. The composition of claim 3 wherein the polyhydric alcohol is pentaerythritol.

11. The composition of claim 3 wherein the polyhydric alcohol is sorbitol.

12. The composition of claim 3 wherein the polyhydric alcohol is glycerol.

13. The composition of claim 3 wherein the polyhydric alcohol is a polyhydroxy ether.

14. The composition of claim 3 wherein the polyhydric alcohol is a polymeric polyhydric alcohol.

15. The composition of claim 13 wherein the polyhydroxy ether is a derivative of a dihydric phenol and contains alternating aliphatic chains and aromatic nuclei united through ether oxygen, said resinous alcohol containing 1,2 epoxy groups and being free from functional groups other than hydroxyl and epoxy groups.

16. A composition of claim 14 wherein the polymeric polyhydric alcohol is a fusible hydroxyaryl ether of a phenolaldehyde condensate and a monochlorhydrin.

17. A method of preparing a new composition of matter which comprises heating to a temperature within the range of about 190–295° C. in the presence of acetic anhyride a mixture of a polyhydric phenol and at least one ethylenically unsaturated aliphatic monocarboxylic acid having at least about 10 carbon atoms, said polyhydric phenol being a polyester of a polyhydric alcohol having a molecular weight of not more than about 8,000 and a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms.

No references cited.

UNITED STATES PATENT OFFICE

CERTIFICATE OF CORRECTION

Patent No. 2,908,005                                                    October 6, 1959

Sylvan O. Greenlee

It is hereby certified that error appears in the printed specification of the above numbered patent requiring correction and that the said Letters Patent should read as corrected below.

Column 3, lines 51 and 52, for "diphenolic acids" read -- Diphenolic Acids --; column 7, lines 34 and 35, for "4,4 bis(4-hydroxylaryl)pentanoic acid" read -- 4,4 bis(4-hydroxyaryl)pentanoic acid --.

Signed and sealed this 31st day of May 1960.

(SEAL)
Attest:

KARL H. AXLINE                                               ROBERT C. WATSON
Attesting Officer                                         Commissioner of Patents